July 3, 1923.

G. F. WARNER

VEHICLE SIGNAL

Filed June 10, 1922

1,460,626

3 Sheets-Sheet 1

WITNESS:

G. F. Warner
INVENTOR
BY Victor J. Evans
ATTORNEY

July 3, 1923.
G. F. WARNER
VEHICLE SIGNAL
Filed June 10, 1922
1,460,626
3 Sheets-Sheet 2
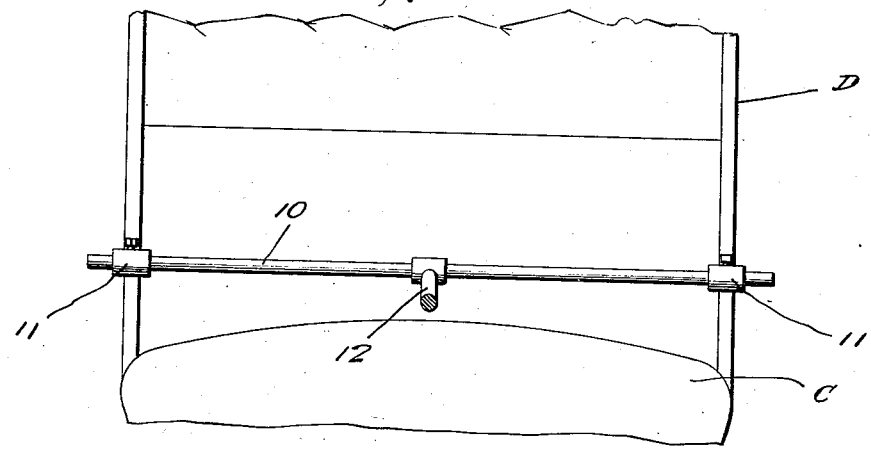
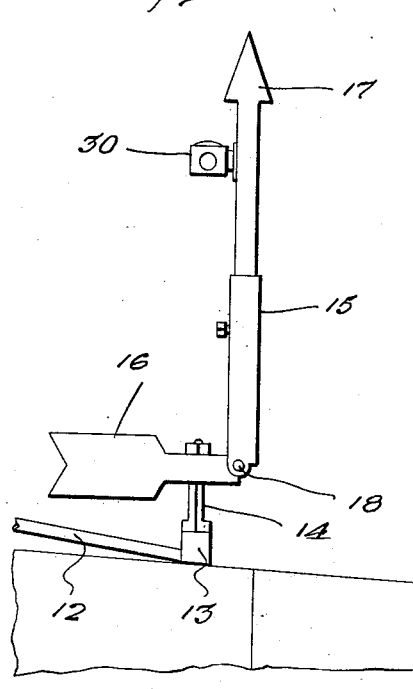
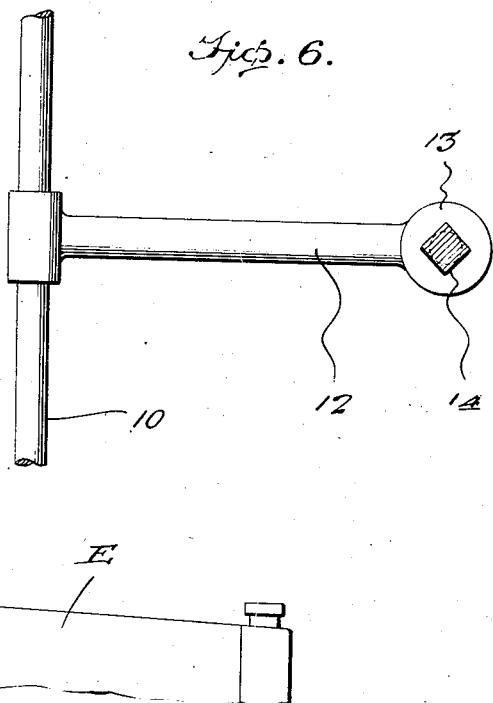
G. F. Warner INVENTOR
BY Victor J. Evans
ATTORNEY
WITNESS: Paul M. Hunt July 3, 1923.
G. F. WARNER
VEHICLE SIGNAL
Filed June 10, 1922
1,460,626
3 Sheets-Sheet 3
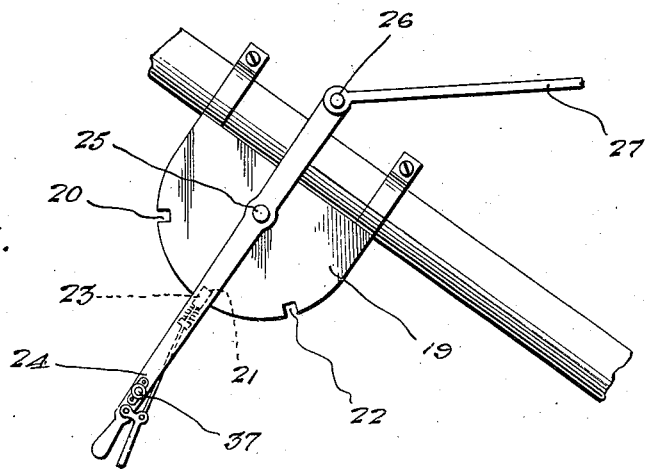
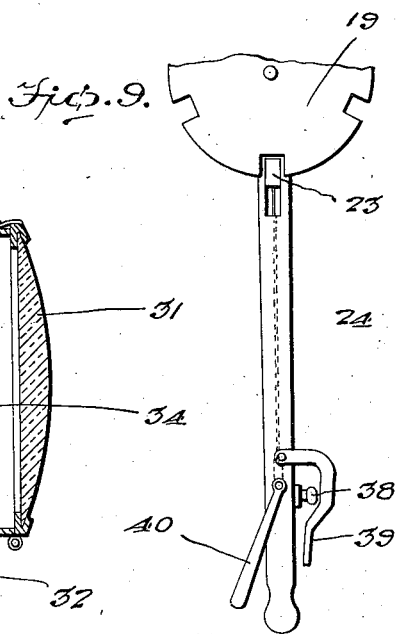
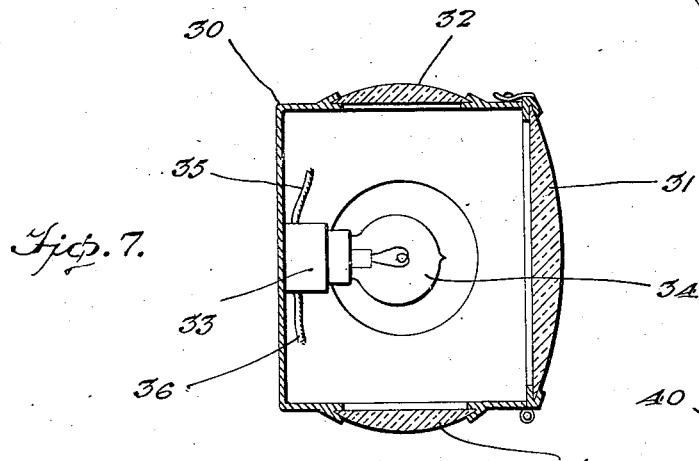
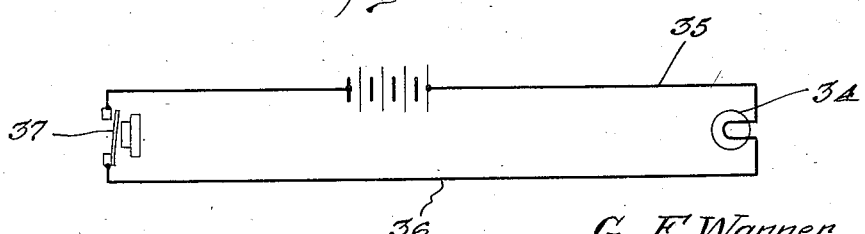
G. F. Warner
INVENTOR
BY Victor J. Evans
ATTORNEY
WITNESS:
Paul M. Hunt Patented July 3, 1923.

1,460,626

UNITED STATES PATENT OFFICE.

GEORGE F. WARNER, OF ENNIS, TEXAS.

VEHICLE SIGNAL.

Application filed June 10, 1922. Serial No. 567,357.

*To all whom it may concern:*

Be it known that I, GEORGE F. WARNER, a citizen of the United States, residing at Ennis, in the county of Ellis and State of Texas, have invented new and useful Improvements in Vehicle Signals, of which the following is a specification.

This invention relates to signals, particularly to direction indicators for automobiles or other vehicles, and has for its object the provision of a signal which is designed to be mounted upon an automobile or the like and to be operated by the driver thereof whereby to apprise the drivers of other vehicles and traffic officers at street corners and the like of any intended change in direction of travel so as to avoid accident and prevent traffic congestion.

An important object is the provision of a manually operated device of this character which is provided with electric illuminating means whereby it may be used to equal advantage either by day or by night.

Another object is the provision of a device of this character which includes a horizontally swingable arrow mounted above the hood and moved by manipulation of a control lever mounted upon the steering column, the arrow carrying illuminating means and being furthermore so constructed that it may be swung upwardly out of obstructing relation to the hood in case it is necessary to open the hood for purposes of making repairs or adjustments to the engine.

Still another object is the provision of a device of this character which includes novel means for supporting the arrow from the cowl or windshield of the vehicle instead of defacing the hood itself.

An additional object is the provision of a device of this character which will be simple and inexpensive in manufacture and installation, easy to operate and control, highly efficient in use, positive and durable in service and a general improvement in the art.

Figure 1:
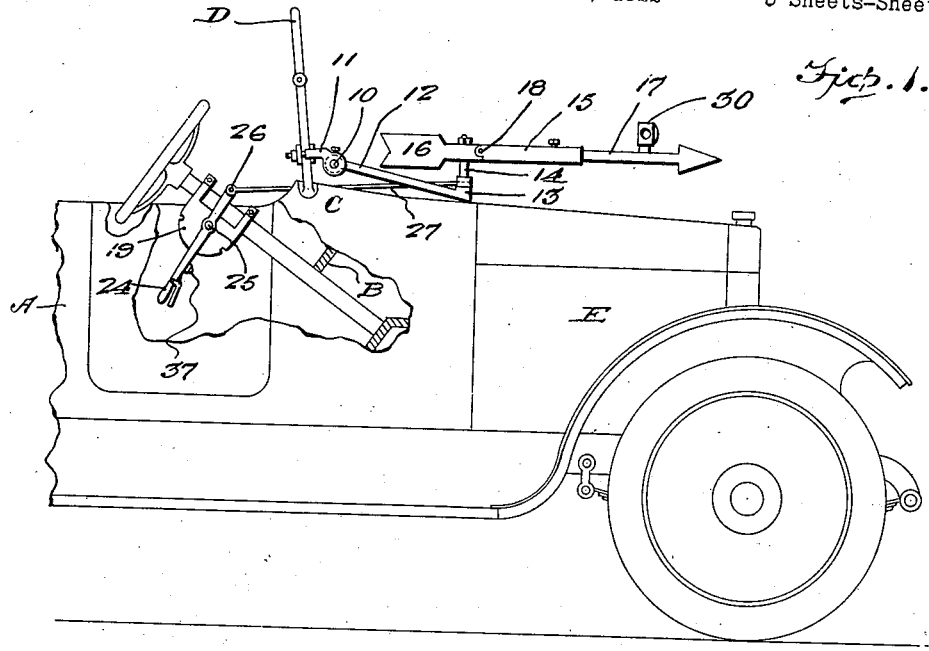
Figure 2:
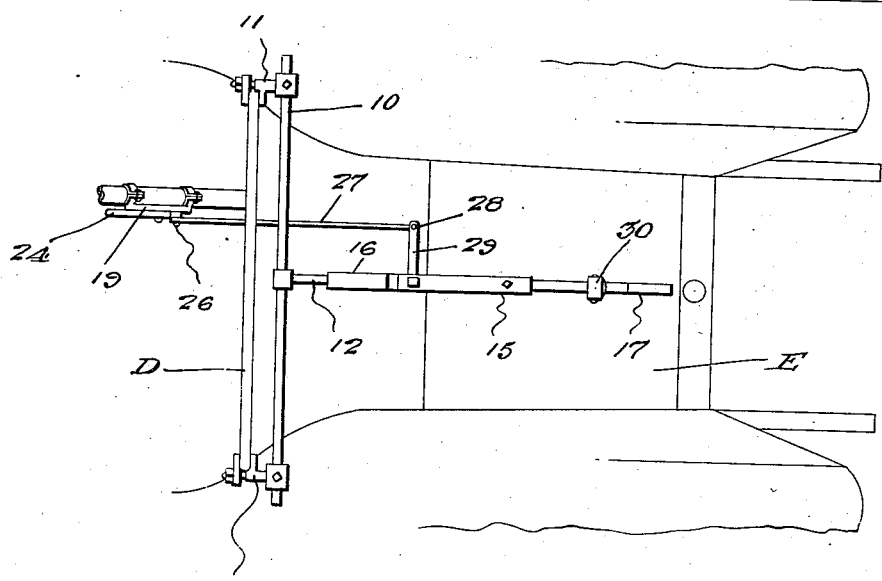

With the above and other objects and advantages in view, the invention consists in the details of construction to be hereinafter more fully described and claimed and illustrated in the accompanying drawings, in which:

Figure 1 is a side elevation of the complete mechanism mounted upon an automobile, a portion of the body of the latter being broken away, Figure 2 is a plan view, Figure 3 is a side elevation of the arrow and the associated parts showing it swung into vertical position to permit opening of the hood, Figure 4 is a view of the windshield looking from the front of the vehicle and showing the mechanism mounted thereon, one element being in section, Figure 5 is a detail elevation of the mechanism carried by the steering column, Figure 6 is a detail horizontal sectional view showing the supporting means for the arrow, Figure 7 is a detail section through the illuminating device, Figure 8 is a diagram of the electric circuit, Figure 9 is an elevation of a modification.

Referring more particularly to the drawings, the letter A designates a portion of an automobile body, B designates the dash, C the cowl, D the windshield and E the hook.

In carrying out my invention I provide a support which includes an elongated rod or bar 10 which is disposed in front of the windshield or in front of the cowl as may be preferred, and which is provided at its ends with adjustable clamps 11 by means of which it may be engaged upon windshields or cowls of different widths and windshields having bars of different thicknesses, these clamps being adjustable in every way whereby to take care of all possible variations. Extending forwardly from the center of this rod or bar 10 is an arm 12 which is horizontally disposed and which extends in slightly spaced relation to the hood and the windshield. At its free end this arm 12 is provided with a bearing 13 for a purpose to be described.

Journally mounted through this bearing 13 is an upright axle or shaft 14 which carries an indicator 15 which is here shown as formed as an arrow but which might be of some other form if preferred. This arrow is preferably colored some conspicuous color so that it will be readily distinguishable by day, and for use at night it carries an illuminating device to be described. This arrow is preferably not formed integral but is formed of two hinged sections 16 and 17 connected as shown at 18 by a rule joint, the purpose being that the section 17 may be swung upwardly into a vertical position as shown in Figure 3 when it is desired to lift up the hood for the purpose of making repairs or adjustments to the engine. If the arrow were rigid it might interfere with the opening of the hood and this would be a manifest drawback.

The normal position of the arrow is naturally straight ahead, but in order to provide means for swinging the arrow to indicate changes in the direction of travel of the vehicle, I make use of a control device which includes a segmental plate 19 which is suitably clamped, bolted or otherwise secured upon the steering post of the vehicle and which is provided with three notches 20, 21 and 22 within any one of which may be engaged a grip released locking pawl 23 carried by a control lever 24 which is suitably pivoted at 25 and which is within convenient reach of the operator or driver of the vehicle. Pivotally connected, as shown at 26, with the upper end of this control lever is a forwardly extending link 27 which has its forward end pivotally connected, as shown at 28, with a lateral arm 29 extending from the arrow.

In order that the device may be used equally as well by night as by day, I provide illuminating means which comprises a lamp casing 30, suitably mounted upon the forward portion 17 of the arrow and provided in its front with a green glass or plain bull's-eye 31 and which is provided in opposite sides with holes covered by red glass 32. Located within this lamp casing is a suitable socket 33 within which is mounted an incandescent bulb 34 from which lead wires 35 and 36, one of which is connected with the storage battery of the car and the other of which is connected with a suitable control switch 37 mounted within convenient reach of the driver; this switch being in turn connected either with the ground or with the other terminal of the battery.

Assuming that the device has been constructed and assembled as above described, the operation is as follows: Under ordinary conditions, that is when the vehicle is traveling straight ahead and there is no contemplated turn, the arrow 15 extends in a straight forward position and the control lever 24 is in the neutral position, that is with the pawl 23 engaged within the central notch 21. In case the device is used at night and the switch 37 is closed, it is apparent that the light within the lamp casing 30 will display only a green or white light to the front which will indicate safety.

When the operator desires to signal his intention to turn either to the left or to the right as the case may be, he grasps the lever 24 and pulls the pawl 23 out of engagement with the notch 21 and moves the lever either forwardly or backwardly as the case may be until the pawl 23 engages within either of the notches 20 or 22. When this is done, the link 27 connected with the arm 29 extending from the arrow will cause a pull or a push upon the arrow and this will result in bringing the arrow horizontally upon its pivot 14 into a position extending transversely of the hood so that it will be conspicuous and consequently notify the drivers of other vehicles, pedestrians and traffic officers of the contemplated turn. When the device is used at night, it is apparent that the green light will then be displayed at one side or the other whereas the red light will be visible to the front or the rear as the case may be for giving the warning signal. After the contemplated turn has been made the operating lever 24 is of course returned to its neutral or intermediate position so as to return the arrow to its straight ahead position.

In Figure 9 I have shown a slight modification in which the control lever 24 which co-operates with the segment 19 carries a push button 38 connected in circuit with the horn of the vehicle and in position to be engaged by a lever 39 which is pivoted upon the lever 24. The grip 40 which releases the locking pawl 23 is also pivoted upon the lever 24 near the lever 39 but projects farther toward the end of the lever 24. This form of the device operates just the same as the first described form except that if desired the operator may grasp both of the levers 39 and 40 when shifting the signal arrow and thereby cause pressure to be applied to the push button 38 which will sound the horn of the vehicle simultaneously with the giving of the visible signal.

From the foregoing description and a study of the drawings, it will be apparent that I have thus provided a simply constructed and consequently inexpensive signaling device which consists of a very few parts and which may be easily installed upon an automobile already in existence or which may be manufactured and sold with the car when the same is produced by the factory. It is also apparent that the sizes of the various parts may vary so as to fit properly upon automobiles of different makes or types and that any desired construction and fitting may be employed as well as any various material which may be found advisable. Owing to the simplicity and construction it is apparent that there is practically nothing to get out of order and the device should have a long life and satisfactorily perform all the functions for which it is intended.

While I have shown the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. A signaling device for vehicles comprising an indicator pivoted for horizontal swinging movement above the hood of a vehicle, a support carried by the windshield and having a bearing for said indicator, a control lever mounted within the vehicle and having an operative connection with said indicator whereby to swing the latter, said indicator being formed of sections hingedly connected by a rule joint whereby the foremost section may be swung upwardly into vertical position out of obstructing relation to the hood to permit opening of the latter.

2. A signalling device for vehicles comprising a horizontally swingable indicator mounted above the cowl and hood of the vehicle, and means for swinging said indicator, said indicator having a hinged section swingable vertically to be in non-obstructing relation to the hood whereby not to interfere with opening movement thereof.

3. A signaling device of the character described comprising a longitudinally adjustable bar provided with clamping means adapted for engagement with opposite edges of a wind shield frame, a forwardly extending arm carried by said bar, an indicator pivoted upon the forward end of the arm and swingable in a horizontal plane, a lateral extension on said indicator, and a manually movable control lever pivoted upon the steering post and having a link connected with said lateral extension.

4. A signalling device for vehicles comprising a bar disposed in advance of the windshield, clamping members adjustable longitudinally upon the ends of said bar and engaging the opposite sides of the windshield, a forwardly extending arm carried by said bar, an indicator pivoted for horizontal movement upon said arm, and means for swinging said indicator.

In testimony whereof I affix my signature.

GEORGE F. WARNER.